United States Patent
Tatewaki et al.

(10) Patent No.: US 9,206,803 B2
(45) Date of Patent: Dec. 8, 2015

(54) OIL PUMP APPARATUS WITH PUMP SECTION AND SEGMENTED OIL INTAKE CIRCUIT

(75) Inventors: Keichi Tatewaki, Atsugi (JP); Akio Nonomura, Isehara (JP); Yasuhiro Kawachi, Isehara (JP)

(73) Assignees: JATCO LTD, Fuji-Shi (JP); NISSAN MOTOR CO., LTD., Yokohama-Shi (JP)

(*) Notice: Subject to any disclaimer, the term of this patent is extended or adjusted under 35 U.S.C. 154(b) by 1136 days.

(21) Appl. No.: 13/117,312

(22) Filed: May 27, 2011

(65) Prior Publication Data

US 2011/0293442 A1 Dec. 1, 2011

(30) Foreign Application Priority Data

May 31, 2010 (JP) .................................. 2010-124300

(51) Int. Cl.
| | |
|---|---|
| *F04C 15/00* | (2006.01) |
| *F04B 53/16* | (2006.01) |
| *F04B 53/18* | (2006.01) |
| *F16L 9/02* | (2006.01) |
| *F16L 11/15* | (2006.01) |
| *F16H 57/04* | (2010.01) |
| *F16H 61/00* | (2006.01) |

(52) U.S. Cl.
CPC .............. *F04C 15/0088* (2013.01); *F04B 53/16* (2013.01); *F04B 53/18* (2013.01); *F16H 61/0025* (2013.01); *F16H 61/0031* (2013.01); *F16L 9/02* (2013.01); *F16L 11/15* (2013.01); *F04C 2240/806* (2013.01); *F16H 57/045* (2013.01); *F16H 57/0436* (2013.01); *F16H 57/0443* (2013.01); *F16H 57/0489* (2013.01); *F16H 2312/14* (2013.01); *F16H 2312/20* (2013.01)

(58) Field of Classification Search
CPC .... F04C 23/008; F04C 18/16; F04C 15/0088; F04C 15/0092; F04C 2240/806; F04B 53/18
USPC ...................... 417/410.3, 410.4; 138/177, 178
See application file for complete search history.

(56) References Cited

U.S. PATENT DOCUMENTS

| | | | | |
|---|---|---|---|---|
| 2,459,409 | A | * | 1/1949 | Bjornstjerna .................. 208/179 |
| 4,342,543 | A | * | 8/1982 | Allen et al. .................. 417/211.5 |
| 2004/0164009 | A1* | | 8/2004 | Smith ............................ 210/132 |
| 2010/0018808 | A1* | | 1/2010 | Gloge .......................... 184/6.12 |

FOREIGN PATENT DOCUMENTS

| | | |
|---|---|---|
| JP | 07-229554 A | 8/1995 |
| JP | 2001-165286 A | 6/2001 |
| JP | 2008-169873 A | 7/2008 |

* cited by examiner

*Primary Examiner* — Justin Jonaitis
*Assistant Examiner* — Christopher Brunjes
(74) *Attorney, Agent, or Firm* — Foley & Lardner LLP (57) ABSTRACT

An oil pump apparatus for supplying an oil to a vehicular transmission, includes a pump to suck the oil from an oil reservoir through an inlet port into a pumping chamber, and an intake circuit to convey the oil sucked from the oil reservoir to the inlet port. The intake circuit includes a proximal segment, an intermediate segment and a distal segment. The proximal segment extends from the inlet port, to the intermediate segment. The intermediate segment extends upwards from the proximal segment. The distal segment extends downwards from a first connecting end portion connected with the intermediate segment to a end portion formed with an suction opening to suck the oil from the oil reservoir into the intake circuit.

8 Claims, 6 Drawing Sheets

OIL PUMP APPARATUS WITH PUMP SECTION AND SEGMENTED OIL INTAKE CIRCUIT

BACKGROUND OF THE INVENTION

The present invention relates to oil pump apparatus for supplying oil to a transmission of a vehicle.

A patent document 1 (JP2001-165286 A) shows a conventional pump system including a main oil pump driven by an engine and a sub oil pump driven by a differential gear. In order to hold the sub oil pump inoperative in the normal vehicle travel operation, the suction opening of the sub oil pump is placed at the position higher than the suction opening of the main oil pump. When the oil level becomes lower by the operation of the main oil pump, at least part of the suction opening of the sub oil pump is exposed above the oil level, and hence the sub oil pump becomes unable to function. Thus, the pump system holds the sub oil pump inoperative in the normal vehicle travel operation and avoids power loss by the sub oil pump.

SUMMARY OF THE INVENTION

In the pump system of the patent document 1, the suction opening of the sub oil pump is opened in the atmosphere, and therefore the oil falls off from an intake passage. Therefore, the air is accumulated in the sub oil pump and the intake circuit for the sub oil pump. When the sub oil pump is operated in the state in which the air is accumulated in the intake circuit, the pump system cannot produce a required oil pressure promptly, and cannot supply the required oil pressure to the transmission timely.

Therefore, it is an object of the present invention to provide oil pump apparatus to reduce the quantity of air accumulated in an intake passage even if a suction opening is exposed to the atmosphere, and to restrain an undesired decrease of a pump discharge pressure.

According to one aspect of the present invention, an oil pump apparatus for supplying an oil to a vehicular transmission, comprises: a pump section including a pump mechanism to suck the oil from an oil reservoir through an inlet port into a pumping chamber, to discharge the oil through an outlet port and to supply the oil to the transmission; and an intake circuit provided between the oil reservoir and the pump section and arranged to convey the oil sucked from the oil reservoir to the inlet port of the pump section. The intake circuit includes a proximal segment, an intermediate segment and a distal segment. The proximal segment extends from a first connecting end portion connected with the inlet port of the pump section, to a second connecting end portion connected with the intermediate segment. The intermediate segment extends from a first connecting end portion connected with the second connecting end portion of the proximal segment, to a second connecting end portion which is connected with the distal segment and which is located at a position higher than a position of the first connecting end portion of the intermediate segment. The distal segment extends from a first connecting end portion connected with the second connecting end portion of the intermediate segment to an end portion formed with a suction opening to suck the oil from the oil reservoir into the intake circuit, the first connecting end portion of the distal segment being located at a position higher than the suction opening.

DETAILED DESCRIPTION OF THE INVENTION

Figure 1:
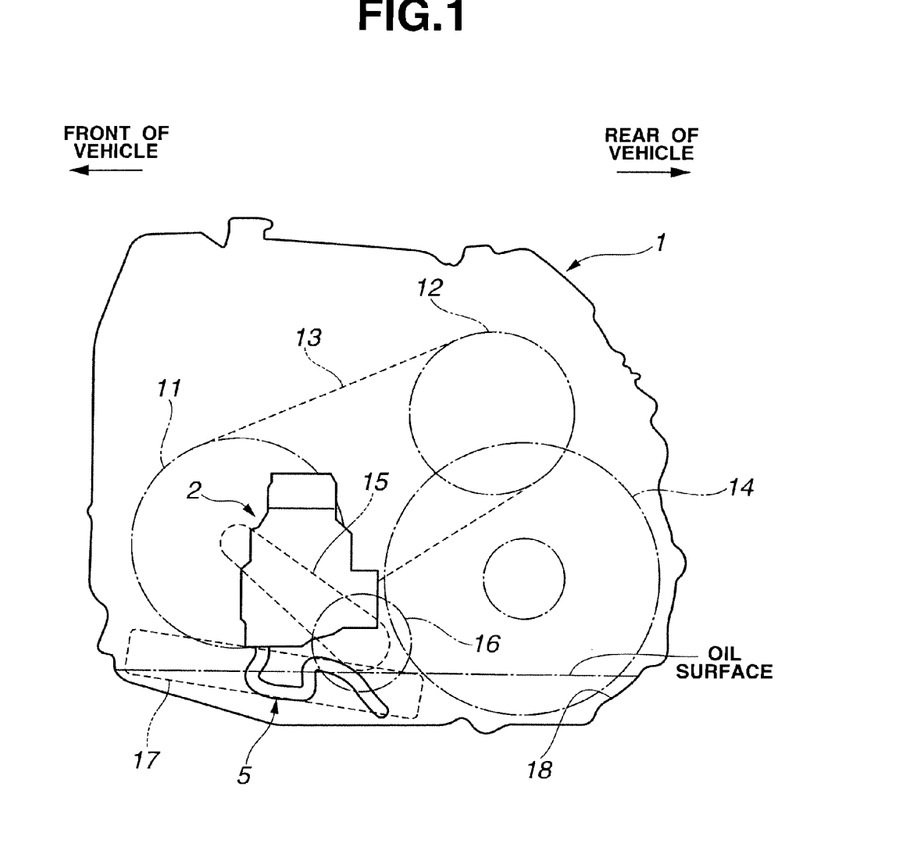
FIG. 1 is a schematic view showing the outline of a belt continuously-variable transmission according to one embodiment of the present invention.

FIGS. 1~9 are views for illustrating an embodiment of the present invention. FIG. 1 shows an outline of a belt type continuously-variable transmission 1 which is connected with an engine (not shown). The belt type continuously-variable transmission 1 includes a primary pulley 11, to which an input rotation from the engine is transmitted. A main oil pump 16 is connected by a chain 15 with a sprocket coaxial with primary pulley 11. Thus, the main oil pump 16 is arranged to be driven by the engine through the primary pulley 11, the sprocket and chain 15.

Primary pulley 11 is connected with a secondary pulley 12 through a belt 13. A driving force is transmitted from primary pulley 11 to the secondary pulley 12, and further transmitted, at a predetermined final reduction ratio, to a differential gear 14. The transmission ratio or the speed ratio of continuously-variable transmission 1 is determined by pulley oil pressures supplied to primary and secondary pulleys 11 and 12 with a known construction. A control valve unit 17 is installed in a lower part of the belt continuously-variable transmission 1, and arranged to regulate a line pressure produced by main oil pump 16 to desired pressure levels, and to supply oil pressures to the primary pulley 11, secondary pulley 12 and engagement elements (not shown). Belt continuously-variable transmission 1 further includes an electric sub oil pump 2 capable of supplying a predetermined oil pressure to control valve unit 17. An oil reservoir 18 is formed in the lower part of belt continuously-variable transmission 1. The oil reservoir 18 is arranged to store the oil in a predetermined amount normally.

(Idle Stop Function)

The vehicle according to this embodiment has a function of idle stop (or a function of no idling). The idle stop or idling stop function is a function to stop the engine to avoid unnecessary engine operation and improve the fuel economy when the ignition switch is ON, the accelerator pedal is OFF, the vehicle speed is zero, the brake pedal is ON, and the steering angle is smaller than or equal to a predetermined angle. When the engine is stopped by the idle stop function, then the main oil pump 16 is brought into an inoperative state unable to produce the oil pressure. Accordingly, the oil pressures of the primary pulley 11, secondary pulley 12 and engagement elements might become too low with oil leakage and other factors, depending on the length of the idle stop time.

If, in this state, a restart condition is satisfied, and the engine is restarted and starts driving the main oil pump 16, the main oil pump 16 cannot supply sufficient oil pressure. Consequently, the transmission might cause unnatural feeling to the driver by belt slippage, and degrade the durability. Therefore, in this embodiment, there is provided the electric sub oil pump 2 arranged to be driven at the time of engine stop by the idle stop function, and thereby to ensure the oil pressure required at the time of engine restart.

(Construction of Sub Oil Pump)

Figure 2:
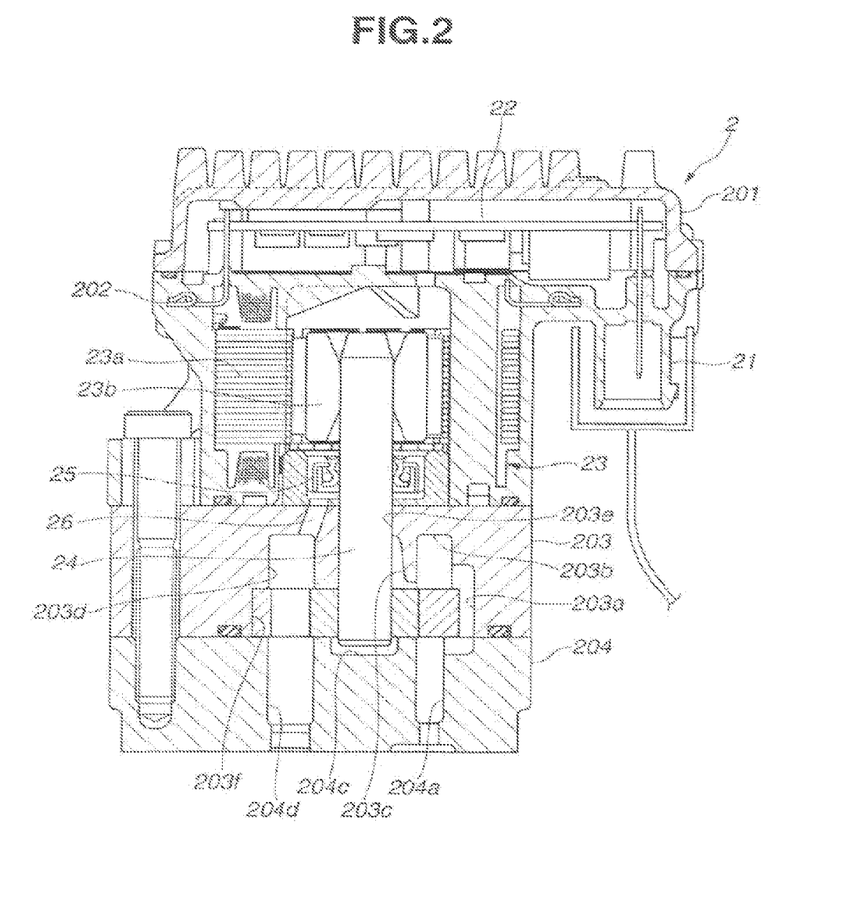
FIG. 2 is a sectional view of a sub oil pump according to the embodiment.

FIG. 2 shows the sub oil pump (or sub oil pump unit or assembly) according to this embodiment in section. Sub oil pump 2 is an electrically driven oil pump, and includes a cover member 201 covering a circuit board 22, a motor housing 202 enclosing a stator 23a and a rotor 23b of a motor 23, a pump main body 203 enclosing an internal gear pump (or pump mechanism), and a pump cover 204 covering the pump main body 203. Motor housing 202 is formed with a connecting portion 21 for receiving electricity for driving the motor 23. A pump drive shaft 24 is attached to the rotor 23b.

Figure 3:
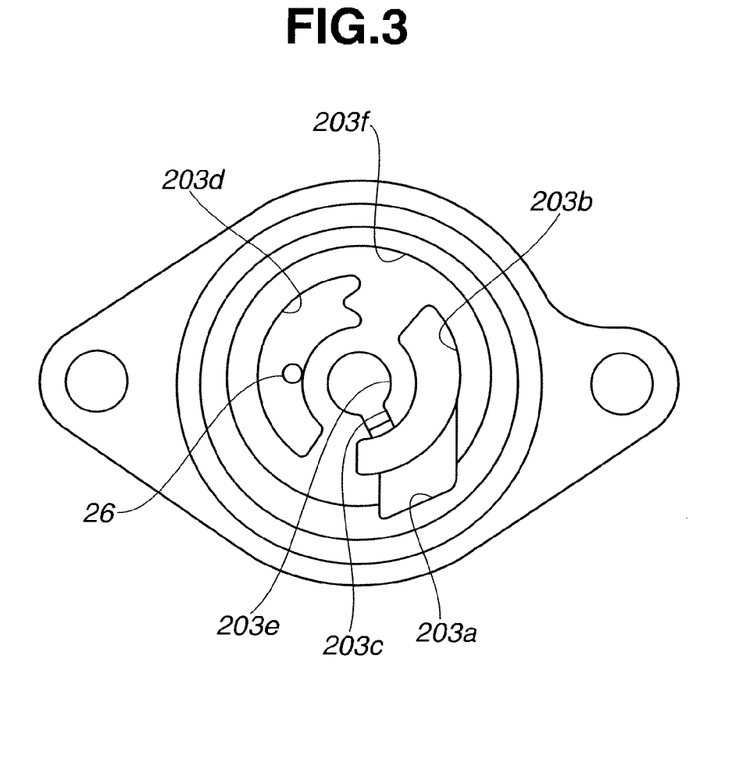
FIG. 3 is a front view showing a pump main body according to the embodiment.
Figure 4:
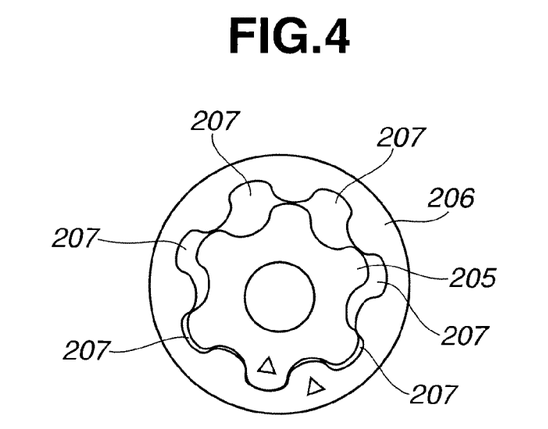
FIG. 4 is a front view showing an internal gear pump (mechanism) according to the embodiment.
Figure 5:
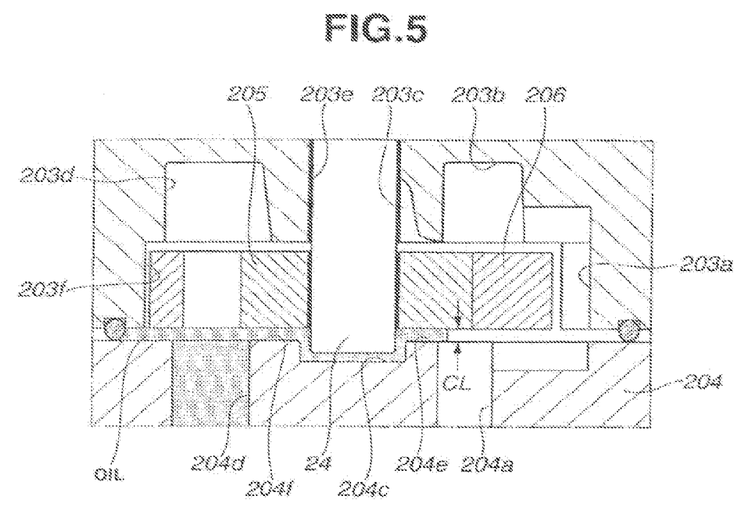
FIG. 5 is a partial enlarged sectional view of the internal gear pump (mechanism) according to the embodiment.

FIG. 3 is a front view showing the pump main body according to the embodiment. FIG. 4 is a front view showing the internal gear pump (mechanism) according to the embodiment. FIG. 5 is an enlarged sectional view showing the internal gear pump (mechanism) according to the embodiment. Pump main body 203 includes: a gear receiving portion 203f receiving an internal gear 206 of the internal gear pump (mechanism) in a manner allowing relative rotation of internal gear 206; a body-side discharge port 203d opened into the gear receiving portion 203f and bored in an arched shape or approximately in a crescent shape; a body-side intake port 203b opened into the gear receiving portion 203f and bored in an arched shape or approximately in a crescent shape; a through hole 203e through which the pump drive shaft 24 extends; a lubricant supplying groove 203c formed in an inside surface of the through hole 203e and arranged to supply a lubricating oil to a sliding contact portion with the pump drive shaft 24; and an inlet groove 203a connecting the body-side intake port 203b with a cover-side intake port 204a formed in the pump cover 204 by a route detouring so as to straddle the outer periphery of internal gear 206. In this example, the body-side intake port 203b and cover-side intake port 204a form an inlet port of a pump section which, in this example, corresponds to the sub oil pump 2. At a bottom portion of body-side discharge port 203d, there is formed a lubricating oil supplying passage 26 to supply the lubricating oil to an oil seal 25 shown in FIG. 2. The body-side intake port 203b and body-side discharge port 203d are arranged so that the body-side intake port 203b and body-side discharge port 203d extend circumferentially around the through hole 203e, and the body-side intake port 203b and body-side discharge port 203d confront each other diametrically across through hole 203e.

The internal gear pump (mechanism) includes the internal gear 206 having a rotation center offset by a predetermined amount from the center of pump drive shaft 24, and an external gear 205 disposed in the internal gear 206. There are formed, between the inside circumference of internal gear 206 and the outside circumference of external gear 205, a plurality of pumping chambers 207. In this embodiment, "the volume of a space formed in the oil pump main body" is the sum of the volumes of the inlet groove 203a, body-side intake port 203b, lubricating oil supply groove 203c, body-side discharge port 203d and pumping chambers 207.

Pump cover 204 includes the cover-side intake port 204a adapted to be connected with the oil reservoir 18; a depression 204c capable of supplying the lubricating oil to a forward end of pump drive shaft 24, and a cover-side discharge port 204d capable of supplying the oil pressure to the control valve unit 17. Pump cover 204 further includes an inside wall surface which faces to the internal gear pump and which includes a seal surface 204e formed around the opening of the cover-side intake port 204a, and a seal surface 204f formed around the opening of cover-side discharge port 204d. In the assembled state, an intake-side region and a discharge-side region are sealed by filling the oil in the clearances between the internal and external gears 206 and 205 and the seal surfaces 204e and 204f.

As shown in FIG. 5 in enlarged section, in the pump according to this embodiment, the sealing performance in a clearance CL between pump main body 203 and pump cover 204 is important. If the clearance CL is filled with air, the viscosity resistance becomes insufficient, and the sealing performance becomes poor. Therefore, the sucked air flows along pump cover 204 directly into cover-side discharge port 204d, and hence the pump becomes unable to produce a pressure difference and unable to perform the function of the pump properly. The clearance CL shown in FIG. 5 is set to have such a width as to obtain the sealing performance without causing excessive friction, in consideration of the viscosity resistance of the oil and other factors.

(Circuit Configuration)

Figure 6:
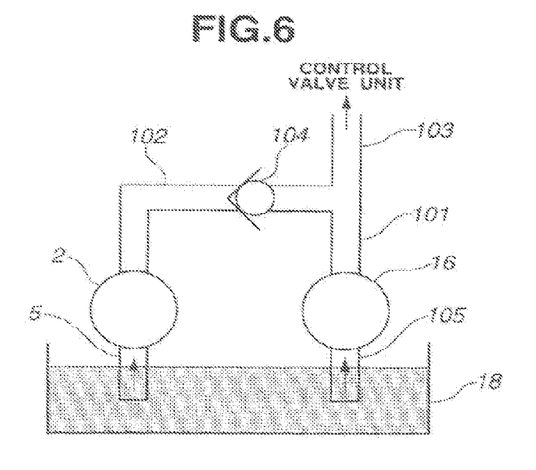
FIG. 6 is a circuit view showing a pump circuit configuration according to the embodiment.

FIG. 6 is a circuit diagram showing the pump circuit configuration according to the embodiment. A first supply passage 101 is connected with the outlet port of main oil pump 16. A second supply passage 102 is connected with the outlet port (203d, 204d) of sub oil pump 2. The first and second supply passages 101 and 102 are connected with a third supply passage 103 for supplying the oil pressure to control valve unit 17. A check valve 104 is disposed in second supply passage 102, and arranged to allow oil flow from the sub oil pump 2 to third supply passage 103 when the outlet pressure of sub oil pump 2 is higher than the outlet pressure of main oil pump 1. Although this check valve 104 is depicted in FIG. 6, in a sideway posture, the check valve 104 is installed in the vehicle in the posture in which the ball of check valve 104 falls by its own weight. Therefore, the second supply passage 102 is normally shut off from the first and third supply passages 101 and 103. It is optional to add a resilient member, such as a spring, for urging the ball. The oil reservoir 18 and main oil pump 16 are connected by a first intake circuit 105. The oil reservoir and sub oil pump 2 are connected by a second intake circuit 5.

Problem to be Solved by the Embodiment

Figure 7A:
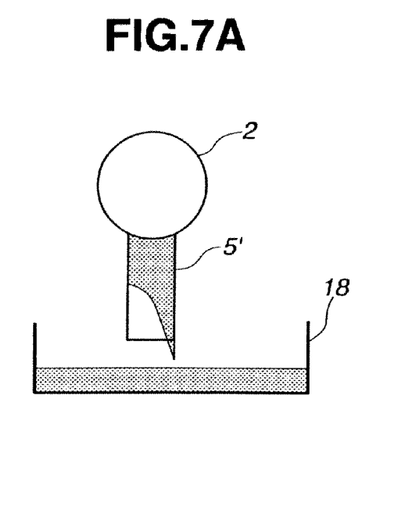
FIGS. 7A and 7B are schematic views for illustrating a problem to be solved by the embodiment.
Figure 7B:
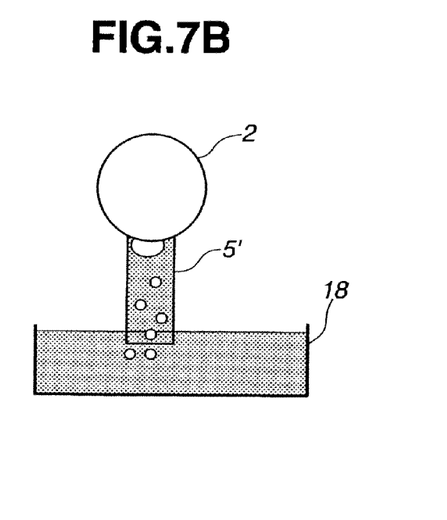

FIGS. 7A and 7B are schematic views for illustrating a problem to be solved by the embodiment. In this embodiment, the dual pump system includes two independent intake circuits, the first and second intake circuits 105 and 5, connected, respectively, with main oil pump 16 and sub oil pump 2. The main oil pump 16 is always driven during the engine operation. Therefore, even if air is involved in some amount in the first intake circuit 105, the main oil pump 16 does not suck a large amount of air, and moreover the sucked air is discharged rapidly, so that no or little pressure decrease is caused.

On the other hand, sub oil pump 2 is an auxiliary pump operated only at the time of engine idle stop. In other words, sub oil pump 2 is inoperative when the engine is operated. Moreover, the check valve 104 basically blocks the oil flow from sub oil pump toward third supply passage 103. Therefore, if air is involved in a large amount in sub oil pump 2, the air has no space for escape. The oil is stored in a predetermined amount in the oil reservoir 18, and the open end of second intake circuit 5 is basically submerged in the oil in oil reservoir 18. Therefore, the second intake circuit 5 is basically arranged to make it difficult for air to enter the second intake circuit 5. However, as shown in FIGS. 7A and 7B schematically illustrating involvement of air, there is a possibility, in the construction of a second intake circuit 5' of an earlier technology, that air is involved in a large amount in the second intake circuit 5' and sub oil pump 2 when the amount of the stored oil becomes smaller, when the oil surface moves largely as in a travelling operation on an uphill grade or a rapid acceleration or deceleration, or when air bubbles are produced in the oil by agitation by the differential gear 14 at high vehicle speeds.

If air is accumulated, and the volume of the air exceeds the volume of the space formed in the oil pump main body, the oil drops out of the clearances between the side surfaces of internal and external gears 206 and 205 and the seal surfaces 204e and 204f of pump cover 204. Accordingly, the sealing is lost and the pump cannot function properly. This problem has been found by the inventor(s) of the present application. In the embodiment, therefore, the second intake circuit 5 is so designed that the amount of air accumulated in second suction circuit 5 is smaller than or equal to a predetermined value.

(Construction of Second Intake Circuit 5)

Figure 8:
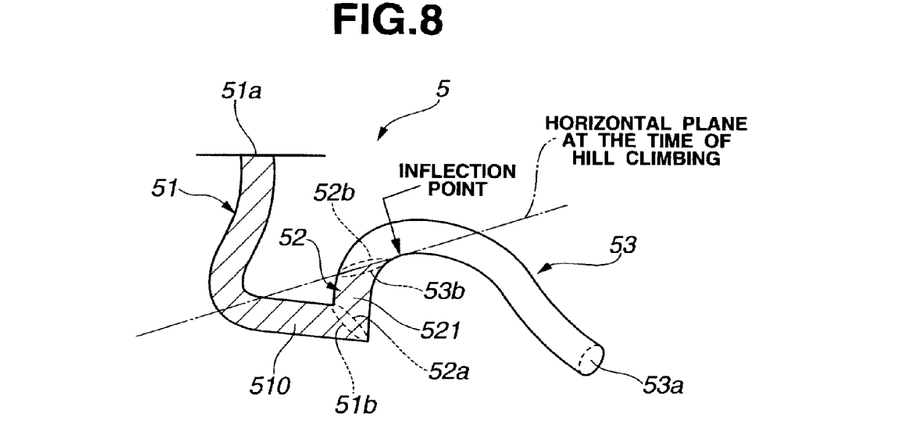
FIG. 8 is an enlarged view showing the structure of a second intake circuit according to the embodiment.

FIG. 8 shows the construction of second intake circuit 5 according to the embodiment. Second intake circuit 5 includes a proximal segment 51 (or base segment), an intermediate segment 52 and a distal segment 53 (or forward end segment). Second intake circuit 5 is formed by bending a single member. The proximal, intermediate and distal segments 51, 52 and 53 are integral portions of the single member forming a continuous single fluid passage. The intermediate segment 52 extends from one end of the proximal segment 51 to one end of the distal segment 53.

The proximal segment 51 extends from a first connecting end portion 51a connected with the cover-side intake port 204a, to a second connecting end portion 51b located below the first connecting end portion 51a and connected with the intermediate segment 52, and includes a horizontal sub-segment 510 extending along the side surface of the control valve unit 17. The horizontal sub-segment 510 extends at a height of the bottom surface of control valve unit 17, as shown in FIG. 1.

The intermediate section 52 extends from a first connecting end portion 52a connected with the second connecting end section 51b of the proximal segment 51, to a second connecting end portion 52b located above the first connecting end portion 52a and connected with the distal segment 53. Thus, the proximal segment 51 extends downwards from the first connecting end portion 51a, and then the intermediate segment 52 extends upwards. Therefore, the section between the check valve 104 and the intermediate segment 52 is held in the filled state in which the oil is filled. The intermediate segment 52 includes a vertical sub-segment 521 extends vertically in the upward direction and forms a bent of an approximately 90 degrees, with the horizontal sub-segment 510 of proximal segment 51.

The distal segment 53 extends from a first connecting end portion 53b connected with the second connecting end portion 52b of intermediate segment 52, to a second end portion including a suction opening 53a for sucking the oil stored in the oil reservoir 18, into the second intake circuit 5. The connecting end portion 53b is located above, or at a position higher than, the suction opening 53a. The suction opening 53a is located below, or at a position lower than, the intermediate segment 52. The first connecting end portion 53b is set so as to coincide substantially with a horizontal plane when the vehicle is at rest on an inclined road surface. The horizontal plane containing the connecting end portion 53b of distal segment 53 is set at a height containing an inflection point. In an inside surface of the distal segment 53 as viewed in a vertical section containing a center line or center axis of the distal segment 53, this inflection point is a point on a curve formed by the inside surface of the distal segment 53 at which the inside surface extending upwards from the suction opening 53a starts declining, and this inflection point is a point on a lower side. In the vertical section, the inside circumferential surface defining the inside bore of the distal segment 53 is shown by upper and lower curved lines extending along the center line of distal segment 53, and the inflection point is a point on the lower curved line.

The distal segment 53 is so designed that the volume of the inside bore of distal segment 53 is smaller than the volume of the space formed in pump main body 203. The volume of the space formed in pump main body 203 is the sum of the volumes of the inlet groove 203a, body-side intake port 203b, lubricating oil supplying groove 203c, body-side discharge port 203d, and pumping chambers 207. As explained with reference to FIG. 5, even if air in the second suction circuit 5 is introduced into the sub oil pump 2 during the operation of sub oil pump 2, the sub oil pump 2 can operate properly as long as the sealing between the pump cover 204 and the side surfaces of internal gear 206 and external gear 205 is maintained. Therefore, when the volume of sucked air is smaller than the volume of the space, the oil remains in the clearance CL between the pump main body 203 and pump cover 204, so that the pump system can maintain the sealing, and does not suffer undesired oil pressure decrease.

It is optional to set the value of the space formed in the pump main body 203 as being equal to the sum of the volumes of the, body-side intake port 203b, body-side discharge port 203d, and pumping chambers 207, and to set the distal segment 53 so that the inside volume of distal segment 53 is smaller than the thus-defined volume of the space. In this case, the pump system can provide the pump outlet pressure in a more stable and reliable manner.

Figure 9:
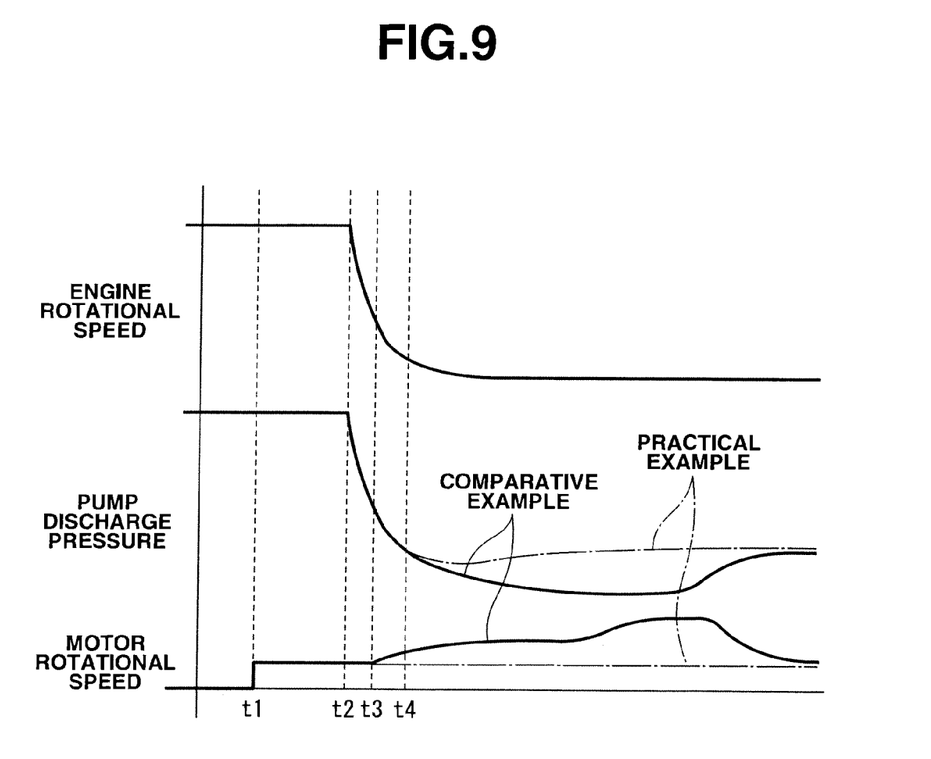
FIG. 9 is a time chart showing a relationship between a pump discharge pressure and a motor rotational speed at the time of idle stop control.

FIG. 9 is a time chart showing a relationship between the pump outlet pressure and the motor speed at the time of the idle stop control. In FIG. 9, a solid line represents a characteristic in a comparative example when air in a quantity greater than or equal to the volume of the space inside the pump main body 203 flows into sub oil pump 2, and a one dot chain line represents a characteristic obtained by a practical example according to this embodiment.

The motor 23 is turned ON at an instant t1 when the idle stop condition is satisfied. When the engine rotational speed starts decreasing at an instant t2, then the discharge quantity of main oil pump 16 becomes lower. In the case of the comparative example, the suction air quantity is too great, and hence the pump system becomes unable to maintain the sealing due to the air introduced into pump main body 203 at an instant t3. As a result, the discharge pressure of sub oil pump 2 decreases, and the pump discharge pressure continues decreasing even after an instant t4. Moreover, in the case of the comparative example, from t1 to t3, the oil in the intake circuit flows into the pump main body, the oil is relieved by a relief valve (not shown) in the state in which a normal discharge pressure is outputted, hence the load of the pump is constant, and accordingly the speed of the driving motor is constant. However, the sealing performance becomes lower at t3 because of the air flowing into the pump main body from the intake circuit, the load of the sub oil pump 2 decreases, and the rotational speed of the motor driving the sub oil pump 2 increases. Thus, in some cases, the discharge pressure may continue to be deficient when the suction air quantity is too great and the sealing becomes poor. If the deficiency in the discharge pressure continues long, the system must restart the engine in response to an engine restart request, in the state in which the oil pressure is not sufficient, and the system suffers deterioration of the starting performance.

By contrast, in the practical example of the present invention, the pump system can ensure the sealing performance by limiting the air quantity, thereby prevent an undesired decrease of the discharge pressure of sub oil pump 2, and provide the required oil pressure. In the case of the embodiment, even after t3, the sealing is not decreased by the air in the second intake circuit 5, and hence the load of sub oil pump 2 is not decreased. Therefore, even after t3, the motor speed is constant, and the sub oil pump 2 supplies the oil pressure to control valve unit 17 through the check valve 104 by producing the discharge pressure overcoming the declining discharge pressure of main oil pump 16 at an instant t4. Therefore, the pump discharge pressure stops decreasing at instant t4, and remains non-decreasing after t4. Therefore, the pump system can ensure the oil pressure required for an engine restart operation.

The pump apparatus or pump system according to the illustrated embodiment of the present invention can provide following effects and merits.

(1) An oil pump apparatus or system is for supplying an oil to a vehicular transmission which, in the illustrated embodiment, is a continuously-variable transmission such as a belt continuously-variable transmission. In the illustrated embodiment, a pump is a sub oil pump (2) to suck an oil from an oil reservoir (18) through an intake port (203*b*) of a pump main body (203) into a pumping chamber or chambers (207), to discharge the oil through a discharge port (203*d*) of the pump main body (203) and to supply the oil to the transmission (or to a control valve unit (17) of the transmission (1)). An intake circuit, such as a second intake circuit (5), is a circuit extending from the oil reservoir (18) toward the pump main body (203) and being arranged to convey the oil sucked from the oil reservoir (18) to the pump main body (203). The intake circuit (5) includes a proximal segment (51), an intermediate segment (52) and a distal segment (53). The proximal segment includes a first connecting end portion connected with the intake port (203*b*) of the pump main body (203) through an intake port (204*a*) of a pump cover (204), and a second connecting end portion (51*b*) connected with the intermediate segment (52). The intermediate segment (52) includes a first connecting end portion (52*a*) connected with the second connecting end portion (51*b*) of the proximal segment (51), and a second connecting end portion (52*b*) which is connected with the distal segment (53) and which is located at the position higher than the position of the first connecting end portion (52*a*) of the intermediate segment (52). The distal segment (53) includes a first connecting end portion (53*b*) connected with the second connecting end portion (52*b*) of the intermediate segment (52), and a second end portion formed with a suction opening (53*a*) to suck the oil from the oil reservoir (18) into the intake circuit (5). The first connecting end portion (53*b*) of the distal segment (53) is located at the position higher than the suction opening (52*a*). Moreover, in the preferred embodiment, the distal segment (53) is so designed that the volume of the inside space of the distal segment (53) is smaller than the volume of the space formed in the pump main body (203).

Therefore, the oil falls off only from the distal segment (53), and the oil is retained in the proximal segment (51) and intermediate segment (52) without falling. Therefore, the pump system can hold the quantity of the air sucked into the pump at the time of the pump operation smaller than or equal to the inside volume of the distal segment (53). Moreover, because the volume of the distal segment (53) is smaller than the volume of the inside space formed in the pump main body (203), the pump system can maintain the sealing performance in the pump and prevent an undesired decrease of the pump discharge pressure.

(2) The suction opening (53*a*) of the distal segment (53) is located at the position lower than the intermediate segment (52). Therefore, the pump can suck the oil stably even if the liquid level is moved in the oil reservoir (18). Moreover, the distal segment (53) extends from the intermediate segment (52), substantially in the form of a straight line toward a deepest portion of the oil reservoir (18). Therefore, even if the position of the sub oil pump main body (203) and the position of the deepest portion of the oil reservoir (18) are spaced apart from each other, it is possible to reduce the inside volume of the distal segment (53) without decreasing the inside diameter of the distal portion too much.

(3) The second connecting end portion (52*b*) of the intermediate segment (52) and the first connecting end portion (53*b*) of the distal segment (53) are connected together in an intersecting plane which is made substantially horizontal when the vehicle is climbing an uphill of a predetermined gradient. Thus, even in a situation in which there is a high possibility of involvement of air in a large quantity, the volume of the distal segment (53) is set smaller than the volume of the space formed in the pump main body (203). Therefore, the pump system can produce the pump discharge pressure in a stable and reliable manner.

(4) The volume of the space formed in the pump main body (203) is the sum of the volumes of pumping chamber(s) (207), and volumes of the intake port (203*b*) and discharge port (203*d*). The distal segment (53) may be formed so that the volume of the inside space of the distal segment (53) is smaller than the thus-defined volume of the space formed in the pump main body (203). Therefore, the pump system can produce the pump discharge pressure in a more stable and reliable manner.

(5) An oil pump apparatus comprises: a main oil pump (16), a sub oil pump (2), first, second and third supply passages (101, 102, 103), a check valve (104), a first intake circuit (105) and a second intake circuit (5). The main oil pump (16) is adapted to be driven by an engine and arranged to supply the oil to a transmission. The sub oil pump is adapted to be driven by an electric motor (23) and arranged to supply the oil from the oil reservoir (18) to the transmission (or to a control valve unit 17 of the transmission). The first supply passage (101) is connected with an outlet port of the main oil pump. The second supply passage (102) is connected with an outlet port (203*d*, 204*d*) of the sub oil pump (2). The third supply passage (103) is connected with the first and second supply passages (101, 102) and arranged to supply the oil to the transmission. The check valve (104) is disposed in the second supply passage (102) and arranged to allow oil flow from the sub oil pump (2) to the third supply passage (103) when the discharge pressure of the sub oil pump (2) is higher than the discharge pressure of the main oil pump (16). The first intake circuit (105) is a circuit connecting the oil reservoir (18) with the main oil pump (16). The second intake circuit (5) is a circuit connecting the oil reservoir (18) with the sub oil pump (2).

Since the check valve (104) is provided between the main oil pump (16) and sub oil pump (2), the pump system cannot discharge air in the circuit including the sub oil pump (2) during the engine operation. When the engine is stopped, and the sub oil pump (2) is driven to supply the oil, the pump system can discharge the oil pressure in the stable and reliable manner because the second intake circuit (5) is configured to restrain the air quantity (with the distal segment 53 having a smaller inside volume).

In the illustrated embodiment, the pump system includes the main oil pump and the sub oil pump. However, the present invention is applicable to a single pump system having only one oil pump, and to a pump system having no electrically-driven pump. In the illustrated example, the proximal segment (51) of the (second) intake circuit extends downwards. However, the present invention is applicable to a pump system in which the intake port is opened sideways, a pump system in which the proximal segment extends laterally or horizontally or a pump system in which the proximal segment (51) extends upwards.

In the illustrated embodiment, the (second) intake circuit (5) is a single continuous pipe. In the example shown in FIG. 8, the single continuous pipe includes a downward pipe segment extending downwards from an upper end (51*a*) connected with the inlet port (203*b*, 204*a*) of the pump section, to a lower end, an upward pipe segment (52) extending upwards from a lower end (52*a*) to an upper end (52*b*), a terminal pipe segment extending from an upper end to a lower end formed with the suction opening (53*a*), a lower pipe segment (510) extending laterally from the lower end of the downward pipe segment, to the lower end (52*a*) of the upward pipe segment (52), and an upper pipe segment extending from the upper end (52*b*) of the upward pipe segment (52) to the upper end of the terminal pipe segment.

In a normal posture of the pump apparatus which the pump apparatus assumes when the pump apparatus is installed in a vehicle and the vehicle is on a level road, the lower pipe segment (510), the upward pipe segment (52) and the upper pipe segment are located vertically between the upper end (51*a*) of the downward pipe segment and the lower end (53*a*) of the terminal pipe segment; the lower pipe segment (510), the upward pipe segment (52) and the upper pipe segment are entirely below the upper end (51*a*) of the downward pipe segment; and the lower pipe segment (510), the upward pipe segment (52) and the upper pipe segment are entirely above the lower end (53*a*) of the terminal pipe segment.

This application is based on a prior Japanese Patent Application No. 2010-124300 filed on May 31, 2010. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An oil pump apparatus for supplying an oil to a vehicular transmission, comprising:
    a pump section including a pump to suck the oil from an oil reservoir through an inlet port into a pumping chamber, to discharge the oil through an outlet port and to supply the oil to the transmission;
    an intake circuit provided between the oil reservoir and the pump section and arranged to convey the oil sucked from the oil reservoir to the inlet port of the pump section,
    the intake circuit including a proximal segment, an intermediate segment and a distal segment,
    the proximal segment extending from a proximal first connecting end portion connected with the inlet port of the pump section, to a proximal second connecting end portion connected with the intermediate segment,
    the intermediate segment extending from an intermediate first connecting end portion connected with the proximal second connecting end portion of the proximal segment, to an intermediate second connecting end portion which is connected with the distal segment at a position higher than a position of the intermediate first connecting end portion and which is located at a position higher than a position of the intermediate first connecting end portion of the intermediate segment, and
    the distal segment extending from a distal first connecting end portion connected with the intermediate second connecting end portion of the intermediate segment to an end portion formed with a suction opening to suck the oil from the oil reservoir into the intake circuit, the distal first connecting end portion of the distal segment being located at a position higher than the suction opening,
    wherein the pump section further includes a pump main body including an intake port forming the inlet port, a discharge port forming the outlet port and at least the pumping chamber, and a volume of an inside bore of the distal segment of the intake circuit is smaller than a volume of a space formed in the pump main body.

2. The oil pump apparatus as claimed in claim 1, wherein the suction opening of the distal segment is located at a position lower than the intermediate segment.

3. The oil pump apparatus as claimed in claim 1, wherein a boundary between the intermediate second connecting end portion of the intermediate segment and the distal first connecting end portion of the distal segment is inclined so as conform to a horizontal plane when the vehicle is climbing upward on a hill.

4. The oil pump apparatus as claimed in claim 1, wherein the volume of the space formed in the pump main body is a sum of a volume of the pumping chamber in the pump main body, and volumes of the intake port and discharge port of the pump main body.

5. The oil pump apparatus as claimed in claim 1, wherein the oil pump apparatus comprises:
    a main oil pump adapted to be driven by an engine and arranged to supply the oil to the transmission;
    the pump section including the pump to supply the oil from the oil reservoir to the transmission, the pump of the pump section being a sub oil pump adapted to be driven by an electric motor;
    a first supply passage connected with an outlet port of the main oil pump;
    a second supply passage connected with an outlet port of the sub oil pump;
    a third supply passage connected with the first and second supply passages;
    a check valve disposed in the second supply passage and arranged to allow oil flow from the sub oil pump when a discharge pressure of the sub oil pump is higher than a discharge pressure of the main oil pump;
    the intake circuit which is a second intake circuit connecting the oil reservoir with the sub oil pump and which includes the proximal segment, the intermediate segment and the distal segment; and
    a first intake circuit connecting the oil reservoir with the main oil pump.

6. The pump apparatus as claimed in claim 1, wherein the intake circuit including the proximal segment, the intermediate segment and the distal segment is a single continuous pipe including:
    a downward pipe segment extending downwards from an upper end connected with the inlet port of the pump section, to a lower end,
    an upward pipe segment extending upwards from a lower end to an upper end, a terminal pipe segment extending from an upper end to a lower end formed with the suction opening, a lower pipe segment extending laterally from the lower end of the downward pipe segment, to the lower end of the upward pipe segment, and an upper pipe segment extending from the upper end of the upward pipe segment to the upper end of the terminal pipe segment.

7. The pump apparatus as claimed in claim 6, wherein, in a normal posture of the pump apparatus:

the lower pipe segment, the upward pipe segment and the upper pipe segment are located vertically between the upper end of the downward pipe segment and the lower end of the terminal pipe segment;

the lower pipe segment, the upward pipe segment and the upper pipe segment are entirely below the upper end of the downward pipe segment; and the lower pipe segment, the upward pipe segment and the upper pipe segment are entirely above the lower end of the terminal pipe segment.

8. The oil pump apparatus as claimed in claim 1, wherein the intermediate segment includes a vertical sub-segment that extends vertically in an upward direction and forms a right-angled bend with a horizontal sub-segment of the proximal segment.

\* \* \* \* \*